United States Patent [19]
Cameron et al.

[11] 4,414,071
[45] Nov. 8, 1983

[54] ELECTRODE

[75] Inventors: Donald S. Cameron, Reading; Susan J. Cooper, Finchampstead, both of England

[73] Assignee: Johnson, Matthey & Co., Limited, London, England

[21] Appl. No.: 254,494

[22] Filed: Apr. 15, 1981

[30] Foreign Application Priority Data

Apr. 22, 1980 [GB] United Kingdom ................ 8013146

[51] Int. Cl.³ .......................... C25B 11/10; C25B 1/34
[52] U.S. Cl. ................................. 204/242; 204/290 R
[58] Field of Search ............................ 204/290 R, 242

[56] References Cited

U.S. PATENT DOCUMENTS

| 3,250,646 | 5/1966 | Hipp | 429/45 |
| 3,778,307 | 12/1973 | Beer | 427/57 |
| 4,190,516 | 2/1980 | Kajimaya et al. | 204/290 R |
| 4,279,709 | 7/1981 | McIntyre et al. | 204/98 |
| 4,285,797 | 8/1981 | Wagu et al. | 204/290 R |

Primary Examiner—F. Edmundson
Attorney, Agent, or Firm—Cushman, Darby & Cushman

[57] ABSTRACT

An electrode for use as a cathode in a chloralkali cell or a water electrolysis cell comprises an electrically-conductive matrix having a very low metal loading surface electrocatalytic noble metal-containing deposit which may be prepared by a displacement deposition technique.

5 Claims, 7 Drawing Figures

FIG.1.

ELECTRODE

This invention relates to cathodes for electrochemical reactions in solution and in particular to a cathode for use, for example, in the electrolysis of an alkali metal salt, to a process for the preparation of such cathodes, and to electrolytic cells incorporating such cathodes.

Alkali metal hydroxides are typically electrolysed in a "water electrolysis cell" to produce hydrogen at the cathode and oxygen at the anode.

Alkali metal salts, wherein the salt is the chloride, are typically electrolysed in a so-called "chloralkali cell," in which a solution of alkali metal chloride, typically sodium chloride, is electrolysed to produce, in solution, sodium hydroxide and, at the anode and cathode, chlorine gas and and hydrogen gas respectively. One form of chloralkali cell in current use is a diaphragm cell in which the anode and cathode are separated by a diaphragm through which the electrolyte percolates from the anode compartment to the cathode compartment so that caustic alkali is produced in and is confined to the catholyte. The diaphragm is typically formed from asbestos, glass fibre or the like. Under steady state operating conditions, brine is fed continuously to the anode compartment and percolates through the diaphragm to the cathode compartment in which the surface of the catholyte is maintained at a level somewhat lower than that of the anolyte by continuous withdrawal of the caustic alkali produced, the rate of withdrawal being variable to afford a measure of control over the caustic alkali concentration. Another form of chloralkali cell is an ion-exchange membrane cell in which the diaphragm in a diaphragm cell is replaced by an ion exchange membrane. The use of an ion exchange membrane cell is said to enable production of higher purity caustic at a greater concentration compared with diaphragm cells, at least in part due to the membrane preventing migration of impurity ions to the cathode compartment.

Typically, in diaphragm and membrane cells, anodes are constructed from graphite or ruthenised titanium and cathodes from mild steel.

A basic electrochemical scheme for the cell reaction is as follows:

(a) at the anode $$2Cl^- \rightarrow Cl_2 + 2e^-$$

and (b) at the cathode $$2H_2O + 2e^- \rightarrow H_2 + 2OH^-$$

The cathode reaction more accurately consists of production and adsorption of atomic hydrogen, represented by $$H_2O + e^- \rightarrow H(ads) + OH^-$$

which, at zero overpotential, is in reversible equilibrium with molecular hydrogen, as follows:

$$2H(ads) \rightleftharpoons H_2$$

However, gaseous hydrogen is not actually evolved at zero over-potential. In order to cause evolution of molecular hydrogen, the potential must be increased ie., a "hydrogen overpotential" is applied, represented by $$H(ads) + H_2O + e^- \xrightarrow{desorb} H_2(gas) + OH^-$$

In prior art cells using mild steel cathodes, the requisite hydrogen overpotential is of the order of 300–500 millivolts at a current density of 250 mA.cm$^{-2}$ and a temperature of 80°–90° C.

With the advent of membrane chloralkali cells, which operate with less impure catholytes, more attention has been focussed on the possibility of developing catalyst-coated cathodes (which are normally susceptible to poisoning by impurities) in order to reduce the hydrogen overpotential and thus to contribute to more economical operation of the cell, the cost of electrical power being the heaviest single item of expenditure in the operation of such electrolysis cells.

We have surprisingly found that this object may be achieved by providing a cathode comprising a matrix having a very thin electro catalytic surface deposit of a noble metal or alloy thereof, and, moreover, that the use of a displacement deposition technique is highly effective in producing such a cathode.

According to one aspect of the invention, therefore, a cathode for use in an electrochemical reaction in solution comprises an electrically-conductive matrix carrying thereon a surface electrocatalytic noble metal-containing deposit.

We have found that the minimum loading of noble metal per unit area of cathode surface required for effective operation is lower than the minimum required to provide a continuous electrically-conductive deposit. The electrocatalytic deposit thus generally comprises a discontinuous film or dendrites comprising nodules of noble metal with areas of matrix therebetween forming an exposed continuous or discontinuous network, the electrocatalytic deposit desirably having a high surface area per unit of geometric surface area of matrix. Noble metal loadings may typically be in the range 0.01–10 mg.cm$^{-2}$, preferably 0.03–5 mg.cm$^{-2}$ and even more preferably 0.06–1.2 mg.cm$^{-2}$, electrocatalytic activity being satisfactorily maintained at these loadings.

Surface area depends on the roughness of the surface and may be expressed by "roughness factor", defined as the true surface area of the electrode per unit of geometric surface area. We have measured the roughness of a number of electrode surfaces, both of prior art electrodes and of cathodes according to the invention, a convenient measuring technique being determination of electrochemical double layer capacitance. Typically, roughness factors for pure nickel roughened by a number of techniques such as shot blasting, acid etching and the like range from 10 to 50 cm$^2$/cm$^2$ of geometric surface area. In comparison, the roughness factor of cathodes according to the invention is typically in the range 100 to 500, preferably 200 to 300 cm$^2$/cm$^2$ of geometric surface area, depending on metal loading and any pretreatment steps.

The electrically-conductive matrix on which is deposited the noble metal should be made from a material which is resistant to attack by alkali metal hydroxides, particularly at concentrations of 30–40% w/v and at elevated temperatures, typically up to about 80°–90° C., being the temperature at which chloralkali cells and water electrolysis cells typically operate due to ohmic resistance heating. Furthermore, due to the preferred method of preparation of electrodes according to the invention (as described hereinafter), the material should be capable of accepting an electro-deposit by immersion plating. Suitable materials include nickel, copper and alloys of nickel and/or copper including alloying metals such as iron, cobalt and chromium. We have found that certain stainless steels are satisfactory, particularly austenitic stainless steels containing nickel and not less than 12% chromium. Suitable stainless steels include those generically known as "18/8" stainless steels for example 347, 310, 304 and 321 (all AISI designations). Other suitable nickel-containing alloys are "Inconel" (Registered Trade Mark) alloys, for example "Inconel" 600 and 625, and "Incalloy" (Registered Trade Mark) alloys, for example "Incalloy" 800, 825 and DS.

The matrix may constitute the ultimate support, that is to say, the cathode body, or may constitute a layer itself deposited on a further support, for example of mild steel. The matrix material, if deposited on a further support, may conveniently be so deposited by means of a prior art electroplating or electroless plating technique.

The preferred matrix material is nickel, which may be deposited on a mild steel support but is suitable for forming the cathode body and receiving the electrocatalytic noble metal-containing deposit directly thereon. Stainless steel also is suitable for forming the cathode body and for receiving directly the electrocatalytic noble metal-containing deposit, although it may equally be provided with a deposit of electrically-conductive matrix material, for example nickel, before application of the electrocatalytic deposit.

The cathode surface electrocatalytic noble metal-containing deposit preferably comprises a noble metal or a mixture or alloy of two or more noble metals, but may include one or more base metals, for example copper or nickel. By "noble metals" we mean the platinum group metals, silver and gold and by "platinum group metals" we mean platinum, rhodium, ruthenium, palladium, iridium and osmium. We prefer to use platinum, rhodium, and/or ruthenium, especially ruthenium and alloys or mixtures thereof with platinum.

We have found that a highly effective method for applying the noble metal-containing deposit to the matrix is by a displacement deposition technique. Such a technique surprisingly results in a deposit which is strongly adherent to the matrix and appears to be remarkbly scratch and abrasion-resistant. We believe that it may have self-healing properties following scratching, for example.

The invention also includes, therefore, a process for preparing a cathode for an electrochemical reaction in solution, the process comprising contacting an electrically-conductive matrix with a noble metal compound in solution such that at least some of the noble metal is exchanged with at least some of the material of the matrix and the noble metal is deposited on the matrix.

The noble metal compound may comprise a salt or a complex, and the solvent is typically water, although other solvents will suffice. Conveniently, where platinum is to be deposited, chloroplatinic acid may be used as the compound and where rhodium or ruthenium is to be deposited rhodium trichloride or ruthenium trichloride respectively may be used.

Contacting of the matrix with the solution may be effected by dipping, by spraying or by any other convenient technique. For a dipping process, the noble metal conveniently has a concentration between 0.05 and 10 $gl^{-1}$, preferably between 1 and 4 $gl^{-1}$, expressed as metal, whereas, for a spraying process, higher concentrations may be used, for example between 0.1 and 100 $gl^{-1}$, preferably between 5 and 30 $gl^{-1}$.

In order to increase the speed of the reaction, it may be necessary to add an acid, which conveniently is chosen to have a common anion with the noble metal salt. Rhodium and ruthenium deposition from the chloride, for example, is speeded up by the addition of hydrochloric acid.

The temperature of deposition of noble metal may be varied between room temperature and the boiling point at atmospheric pressure of the solution. Where chloroplatinic acid is used, deposition will normally proceed at room temperature, whereas temperatures of 80° C. or so are preferred for rhodium and ruthenium trichloride.

The matrix material preferably has an electrode potential considerably different from that of the noble metal or metals, such that the deposition reaction as described hereinbefore proceeds spontaneously, ie without the addition of reducing agent. We have found that, typically, deposition times of up to 30 minutes are normally sufficient to provide the requisite metal loading, and we have achieved satisfactory deposits in as little as 5 minutes, although deposition time is temperature-dependent. Some of the matrix base metal gradually goes into solution and is exchanged for noble metal, which may re-deposit as a co-deposit with noble metal.

Table 1 below shows the metal loadings obtained with varying noble metal concentration and deposition times for the deposition of platinum on a nickel matrix, that is, a nickel electrode body. The platinum was present as an aqueous solution of chloroplatinic acid and deposition was carried out at ambient temperature.

TABLE 1

| CPA conc $gl^{-1}$ Pt | Immersion time (min) | Metal loading $mg.cm^{-2}$ |
| --- | --- | --- |
| 1 | 5 | 0.06 |
| 2 | 5 | 0.175 |
| 4 | 5 | 0.263 |
| 4 | 10 | 0.738 |
| 4 | 20 | 1.188 |

We have found that the stability and/or performance of the noble metal deposit may be improved by a heat treatment process following deposition. The heat treatment process may be carried out at temperatures in the range 200°–400° C. for a time ranging from about half an hour, up to two or thres hours, depending on temperature, for example one hour at 300° C. The heat treatment may be carried out in air.

The cathode body may take various physical forms, one possible form being a substantially flat plate. We prefer, however, to increase the macro surface area by the use of a corrugated sheet or plate or by utilising a foraminous structure. By "foraminous" we mean to include any open-mesh or perforate structure, such as those which are already known in the art, as well as porous structures such as sintered bodies and metal foams or sponges. Preferably the surface is roughened prior to applying the electrocatalytic layer. Such roughening may be carried out by prior art techniques such as shot or sand-blasting, etching and the like. We prefer to use an acid etching treatment, for example using nitric acid, optionally in combination with shot-blasting.

Also included in the invention are electrolytic cells, such as for the electrolysis of an alkali metal hydroxide and for the electrolysis of brine, the cells incorporating cathodes comprising an electrically-conductive matrix carrying thereon a surface electrocatalytic noble metal-containing deposit.

We have found that cathodes according to the invention reduce the hydrogen over potential in chloralkali and water electrolysis cells compared with prior art cathodes at a current density in the range 200 to 300 $mA.cm^{-2}$ and a cell operating temperature of about 80° to 90° C. by values of up to about 350 mV under laboratory conditions at very low noble metal loadings, which represent reductions of up to about 200 mV under less favourable plant operating conditions. Furthermore, they maintain their performance over several months or more of continuous use. They therefore represent a significant advance in the technology of such cells contributing to more cost-effective production of such widely used chemicals as chlorine, caustic soda and hydrogen.

Cathodes according to the invention may also be used for the electrolysis of other alkali metal salts, for example the chlorate or nitrate of lithium or potassium, and in electrolysis cells which operate at high pressure and/or temperature and which are capable of producing, for example, liquid chlorine.

Embodiments of the invention will now be described by way of example with reference to the accompanying Examples and drawings. The Examples give details of the preparation of cathodes according to the invention and the Figures illustrate the performance of such cathodes.

EXAMPLE 1

Preparation of a ruthenised, nickel plated mild steel cathode

1. A mild steel electrode body was coated with an electrically-conductive matrix of nickel by a standard electroless nickel deposition technique to a film thickness of 16–20 μm, followed by heat treatment in air for 1 hour at 300° C.
2. The front face was lightly shotblasted and cleaned with acetone, which was evaporated off.
3. The rear face of the electrode was masked off with masking tape.
4. The electrode was etched in nitric acid (2 N) for 1 minute, and rinsed with distilled water.
5. The matrix was provided with a ruthenium electrocatalytic deposit by immersion in ruthenium trichloride solution (Ru 1 $gl^{-1}$) which had been acidified with hydrochloric acid to a pH of 1.8, and heated to 80° C., for 10 minutes.
6. The cathode was washed thoroughly with distilled water, and blotted dry. The catalysed face had a smooth, even silvery grey appearance.
7. The electrode was finally treated at 300° C. in air for 60 minutes to complete the process.

EXAMPLE 2

Preparation and a Pt/Ru catalysed nickel cathode

1. A nickel electrode body having a surface area 5 $cm^2$ was shotblasted, degreased with acetone and allowed to dry.
2. The electrode body was etched in nitric acid (2 N) for 1 minute, rinsed in distilled water, and immersed for 15 minutes in a solution of precious metal salts containing chloroplatinic acid (25 ml of 4 $gl^{-1}$Ru) and ruthenium trichloride solution (25 ml of 4 $gl^{-1}$Ru), the pH being determined as 1.62.
3. The electrode was removed, rinsed thoroughly in distilled water and allowed to dry in air. The catalysed surface had a smooth, even grey appearance.

EXAMPLE 3

Preparation of a ruthenised, stainless steel cathode

1. A stainless steel (18/8) electrode body having a surface area of 5 $cm^2$ was shotblasted, degreased with acetone, and allowed to dry.
2. The body was etched in hydrochloric acid (1 N), (pH 0.62) for 10 minutes at 60°–65° C., then rinsed with distilled water.
3. The electrode was then catalysed by immersion in ruthenium trichloride solution (1 $gl^{-1}$Ru) acidified with hydrochloric acid to pH 0.62 for 30 minutes at 65° C.
4. The cathode was removed, rinsed with distilled water and dried in air. It has a uniform dark grey appearance.

EXAMPLE 4

Preparation of a platinised nickel electrode

1. A nickel electrode body having a surface area of 5 $cm^2$ was shotblasted to roughen the surface, degreased in acetone and and allowed to dry in air.
2. The body was etched by immersion in nitric acid (2 N) for 60 seconds at ambient temperature, and rinsed thoroughly with distilled water.
3. The matrix was provided with an electrocatalytic deposit by immersion in dilute chloroplatinic acid (2 $gl^{-1}$Pt) for 6 minutes at 22° C. The cathode was then removed, rinsed in distilled water and allowed to dry in air. Platinum loading on the cathode was 0.234 $mgcm^{-2}$.

EXAMPLE 5

Preparation of a ruthenised nickel electrode

1. A nickel electrode body was shotblasted to produce an even, matte surface, degreased in acetone, and allowed to dry in air.
2. The body was etched by immersion in dilute nitric acid (2 N) for 60 seconds at 22° C., and washed thoroughly with distilled water.
3. A surface electrocatalytic ruthenium deposit was applied by immersion in ruthenium trichloride solution (1 $gl^{-1}$Ru) which had been acidified by the addition of hydrochloric acid to pH 1.6. The treatment was continued for 10 minutes at 80° C.
4. The cathode was then removed, washed with distilled water and allowed to dry in air, before treating at 300° C. for 1 hour in air. The metal loading of ruthenium on the finished electrode was 0.322 $mgcm^{-2}$.

EXAMPLE 6

Preparation of a rhodium-catalysed nickel electrode

The method of Example 5 was adapted for the preparation of a rhodium-catalysed nickel cathode by utilising a solution of rhodium trichloride (1 $gl^{-1}$Rh) without addition of hydrochloric acid. Deposition time was 20 minutes and temperature was 75° C.

In the accompanying drawings.

Figure 1:
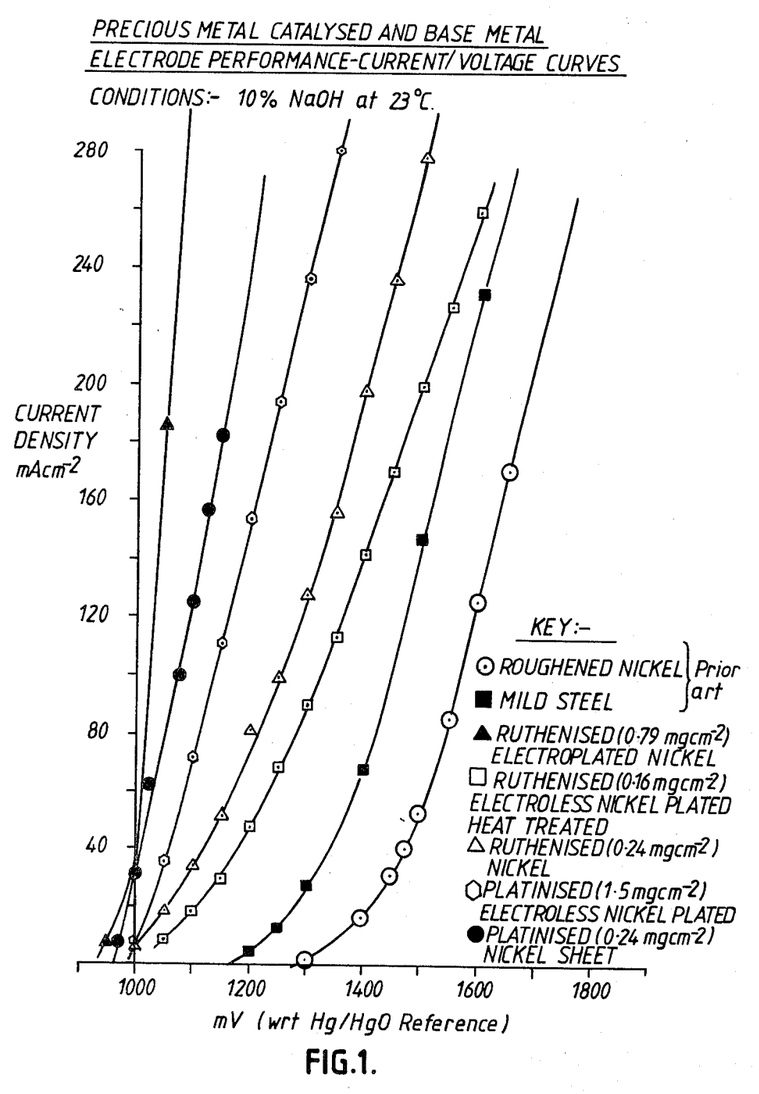
FIG. 1 shows the performance of various cathodes according to the invention compared with prior art nickel and mild steel cathodes in a chloralkali cell operating at 23° C.

Referring first to FIG. 1, the performance of various cathodes according to the invention in a chloralkali cell operating with 10% NaOH at 23° C. is compared with the performance of prior art cathodes comprising roughened nickel and mild steel respectively under the same conditions.

The legend is as follows:

| | |
|---|---|
| ⊙ | Roughened nickel ⎫ prior art |
| ■ | Mild steel ⎭ |
| ▲ | Ruthenium at a metal loading of 0.79 mg.cm$^{-2}$ deposited on a mild steel cathode body carrying an electroplated deposit of nickel. |
| □ | Ruthenium at a metal loading of 0.16 mg.cm$^{-2}$ deposited on a mild steel cathode body carrying an electroless-plated deposit of nickel and heat treated. |
| △ | Ruthenium at a metal loading of 0.24 mg.cm$^{-2}$ deposited on a nickel cathode body. |
| ◊ | Platinum at a metal loading of 1.5 mg.cm$^{-2}$ deposited on a mild steel cathode body carrying an electroless-plated deposit of nickel. |
| ● | Platinum at a metal loading of 0.24 mg.cm$^{-2}$ deposited on a cathode body consisting of a sheet of nickel. |

It is seen from the figure that, at a current density of 200 mA.cm$^{-2}$, the electrode potential for a prior art mild steel electrode is about 1550 mV and for a prior art nickel cathode is about 1650 mV, whereas the potential for cathode according to the invention at a current density of 200 mAcm$^{-2}$ varies between about 1450 MV and 1050 mV, the best performance being for ruthenium on an electroplated nickel matrix, this representing an improvement in hydrogen overpotential compared with mild steel of about 400 mV at a current density of 200 mAcm$^{-2}$.

Figure 2:
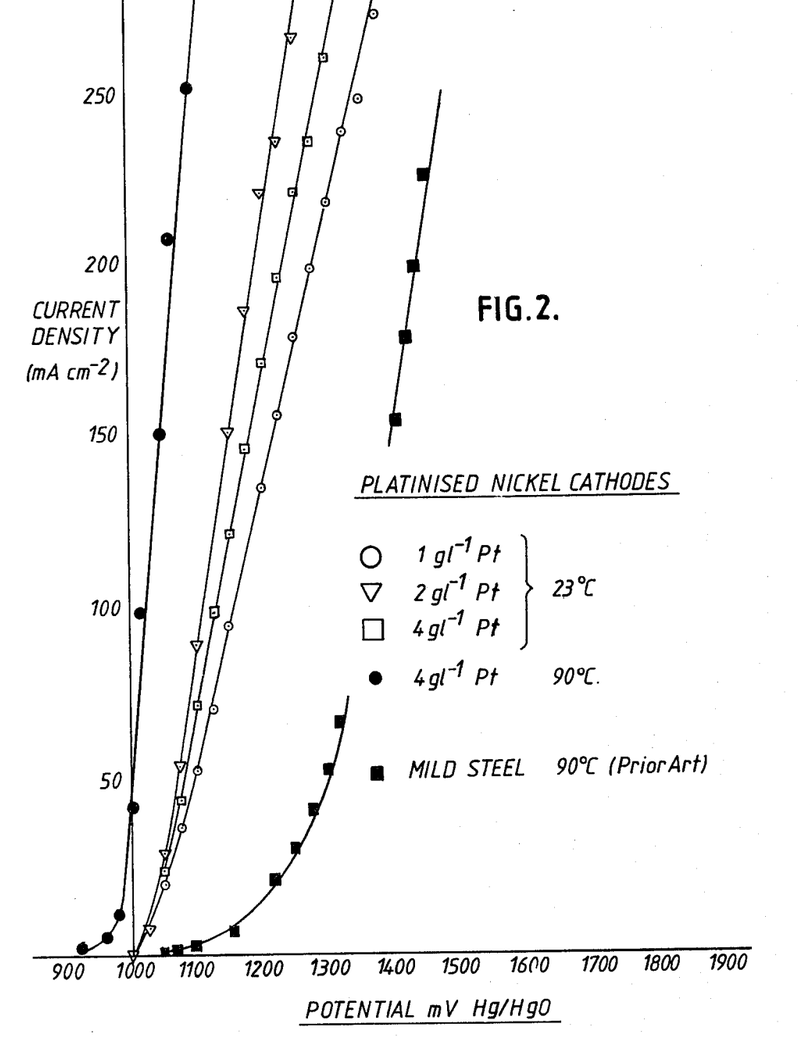
FIG. 2 compares various platinised nickel cathodes according to the invention at 23° C. and 90° C. with a prior art cathode at 90° C.

FIG. 2 illustrates the effect of varying the metal loading on cathodes according to the invention and consisting of platinum deposited on a nickel cathode body pretreated by etching in nitric acid and then being provided with an electrocatalytic deposit of platinum by immersion for 5 minutes in chloroplatinic acid having the following concentrations:

| | |
|---|---|
| ○ | 1gl$^{-1}$ platinum |
| ▽ | 2gl$^{-1}$ platinum |
| □ | 4gl$^{-1}$ platinum |

The cell temperature was 23° C. and it is seen that best results were obtained from the cathode prepared from chloroplatinic acid at a concentration of 2 gl$^{-1}$ of platinum.

The FIG. 2 also shows the results for a cathode, prepared by immersing a nickel cathode body in a solution of chloroplatinic acid at a platinum concentration of 4 gl$^{-1}$ for 20 minutes in a chloroalkali cell running at 90° C., compared with a prior art mild steel cathode also at 90° C. It is seen that the improvement in overpotential at a current density of about 200 mAcm$^{-2}$ using a cathode according to the invention is about 300 mV.

Figure 3:
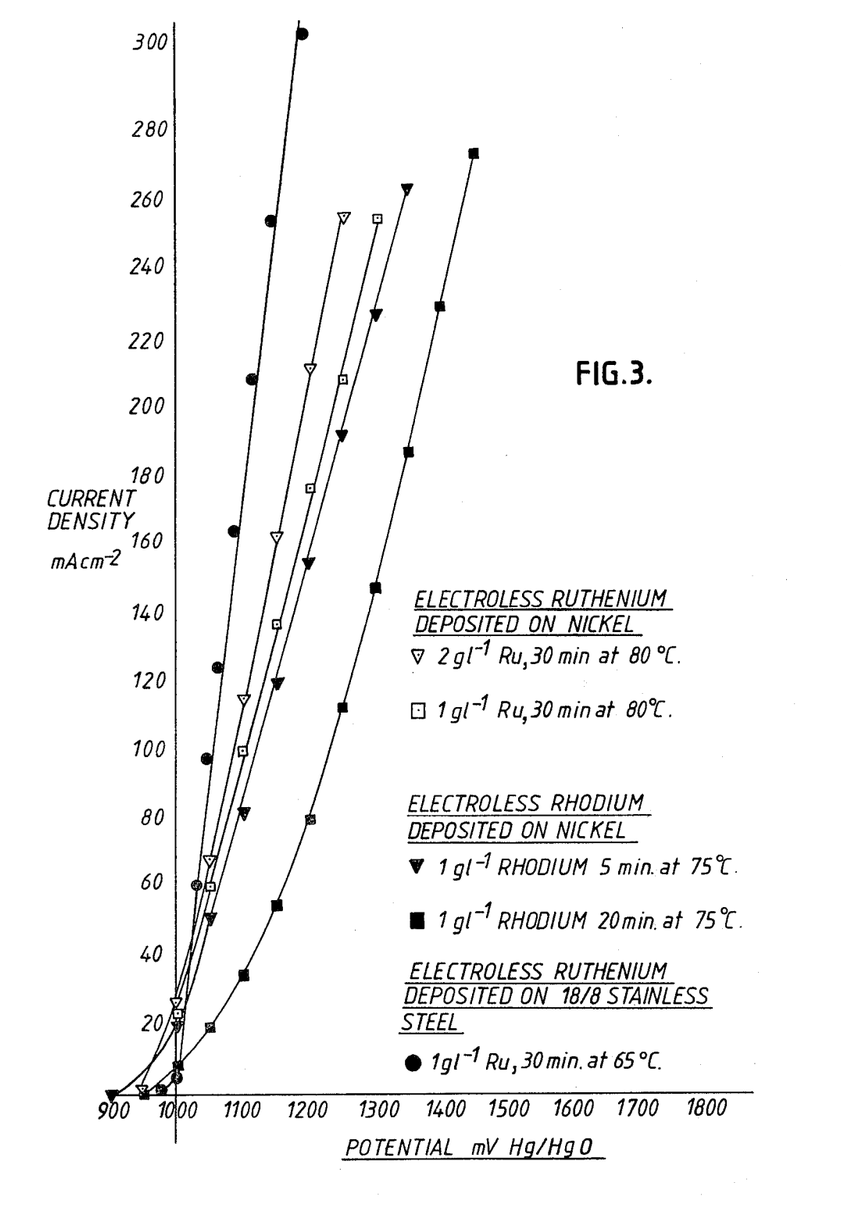
FIG. 3 illustrates the performances of various cathodes having electrocatalytic coatings comprising ruthenium or rhodium at a cell temperature of 23° C.

FIG. 3 shows results for electrode potential of various cathodes according to the invention in a chloralkali cell operating at 23° C. The best results are given by a cathode consisting of ruthenium deposited on an 18/8 stainless steel cathode body by immersion for 30 minutes at 65° C. in a solution of ruthenium trichloride containing 1 gl$^{-1}$ of ruthenium, the electrode potential at 200 mAcm$^{-2}$ being about 1100 mV. The next best performance was given by cathodes consisting of ruthenium deposited on nickel cathode bodies, by immersion of the nickel in solutions of ruthenium trichloride at ruthenium concentrations of 2 gl$^{-1}$ and 1 gl$^{-1}$ respectively for 30 minutes at 80° C. Electrode potentials at 200 mAcm$^{-2}$ were about 1200 and 1220 mV respectively. Finally in FIG. 3 are shown the results for an electrocatalytic coating of rhodium on a nickel electrode body by immersion of the body in a solution of rhodium trichloride at 75° C. for 5 minutes and for 20 minutes respectively; the cathode prepared by the 5 minute immersion gave superior results to that prepared from the 20 minutes immersion. Results for rhodium deposited for 5 minutes from a solution of rhodium trichloride containing 5 gl$^{-1}$ of rhodium at 80° C. with HCl added were much the same as the results for the rhodium on nickel cathode prepared by a 20 minute immersion and are not shown on FIG. 3 for the sake of avoiding confusion.

Figure 4:
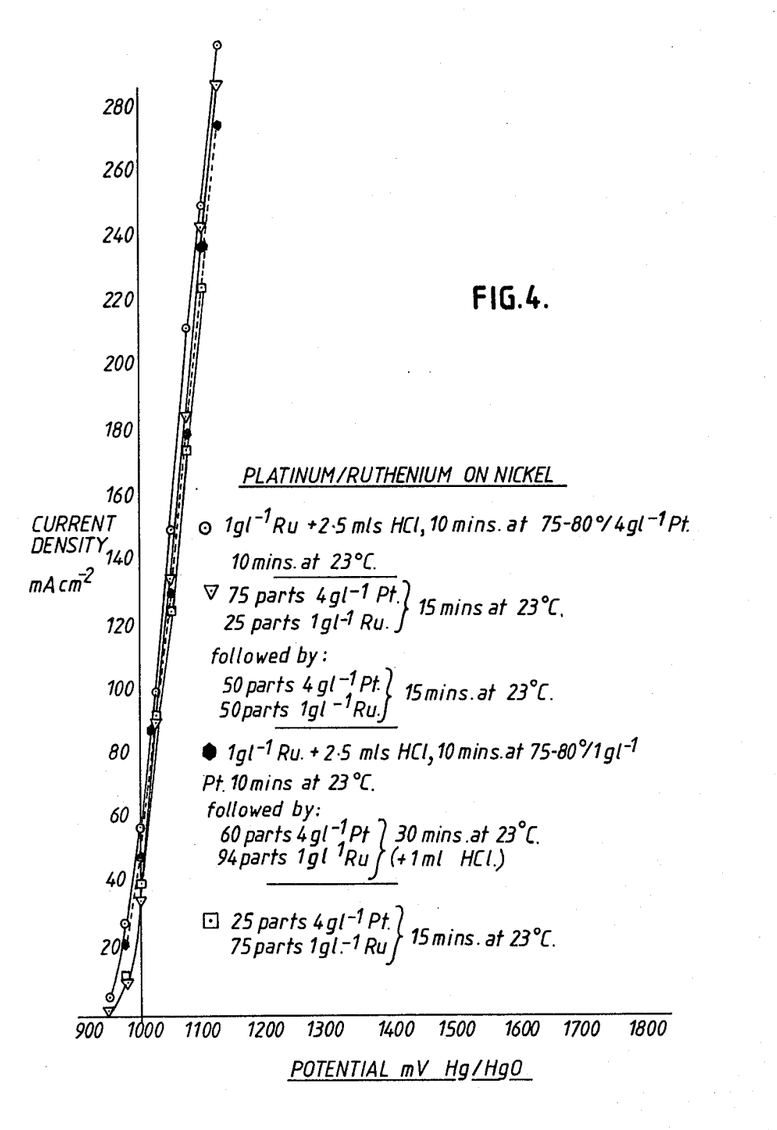
FIG. 4 illustrates the performance of various platinum/ruthenium alloy deposits on a nickel matrix, at a cell temperature of 90° C.

FIG. 4 illustrates the consistently good results that were obtained in a chloroalkali cell operating at 90° C. using cathodes according to the invention and including electrocatalytic deposits of a platinum/ruthenium alloy on a nickel matrix. Cathodes were prepared either by immersion in a mixed metal solution or by sequential immersion in single metal solutions. In the mixed metal solution technique, two solutions of chloroplatinic acid were prepared using double distilled water containing 4 gl$^{-1}$ and 1 gl$^{-1}$ of platinum respectively. Also two solutions of ruthenium chloride containing 4 gl$^{-1}$ and 1 gl$^{-1}$ ruthenium were prepared. Mixtures of the two solutions in varying proportions were used to make up a range of concentrations of platinum and a ruthenium in solution, and etched nickel cathode bodies were immersed in the solutions for 15 minutes at room temperature. In the sequential metallisation technique, the single metal solutions prepared as above, were used separately and the etched nickel cathode bodies were immersed first in the ruthenium trichloride solution for 10 minutes at room temperature, washed thoroughly with distilled water and then immersed in the chloroplatinic acid solution for 10 minutes at room temperature. Both techniques were used to prepare some cathodes, and hydrochloric acid was added to some of the precious metal solutions, however, irrespective of the method of preparation used, it is observed from FIG. 4 that cathode performance was very good, electrode potential at 200 mAcm$^{-2}$ being in the region of 1100 mV at 90° C.

Figure 5:
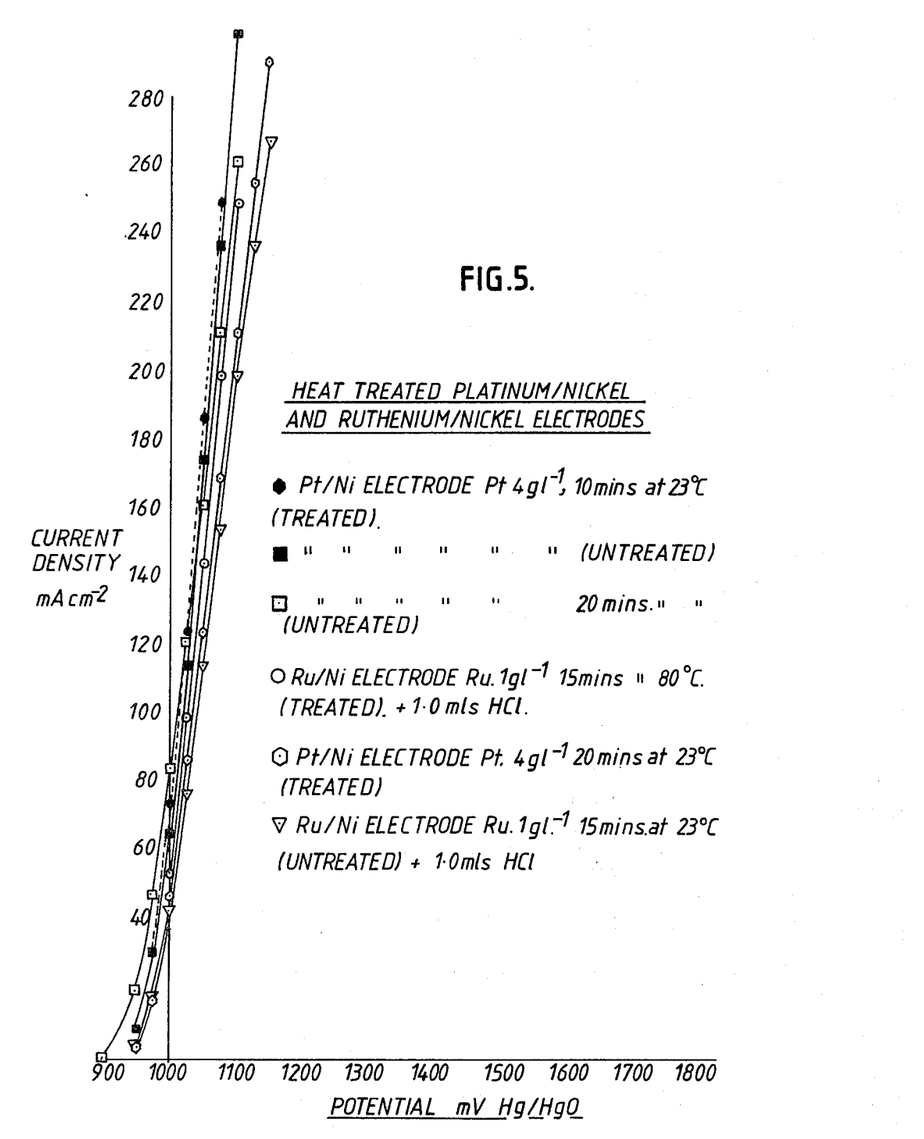
FIG. 5 shows the result of heat treating various cathodes according to the invention.

FIG. 5 illustrates the effect of heat treatment on various cathodes according to the invention containing an electrocatalytic deposit of platinum or ruthenium on a nickel matrix. We have found that, in general, cathodes prepared by deposition from solutions containing a lower concentration of precious metal benefit in terms of stability and adhesion of the precious metal deposit with little change in the electrode potential performance, assessment of adhesion being made by examination under an optical microscope.

Figure 6:
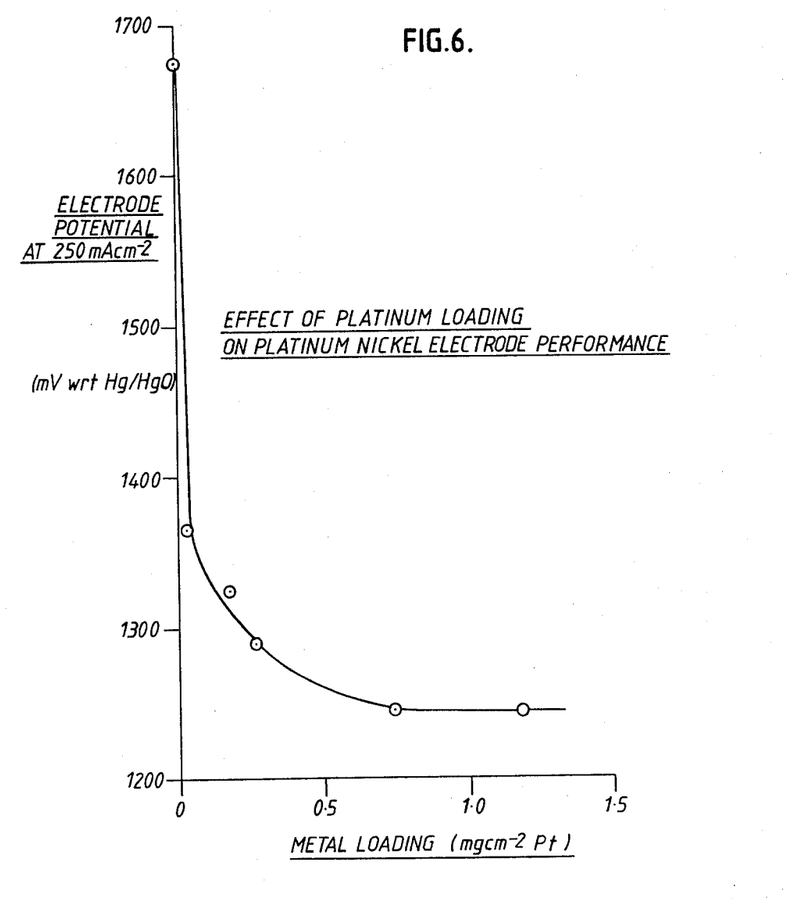
FIG. 6 shows the effect on electrode potential of increasing the metal loading on a platinised nickel cathode according to the invention.

FIG. 6 shows that, with increasing metal loading above about 0.1 mgcm$^{-2}$ of platinum, electrode potential begins to approach a minimum value which is attained at a metal loading of about 0.75 mgcm$^{-2}$. Clearly, the invention is remarkably effective in achieving low electrode potentials at very low metal loadings, to the extent that it is of little benefit to employ metal loadings with platinum on nickel cathodes in excess of about 0.75 mgcm$^{-2}$.

Figure 7:
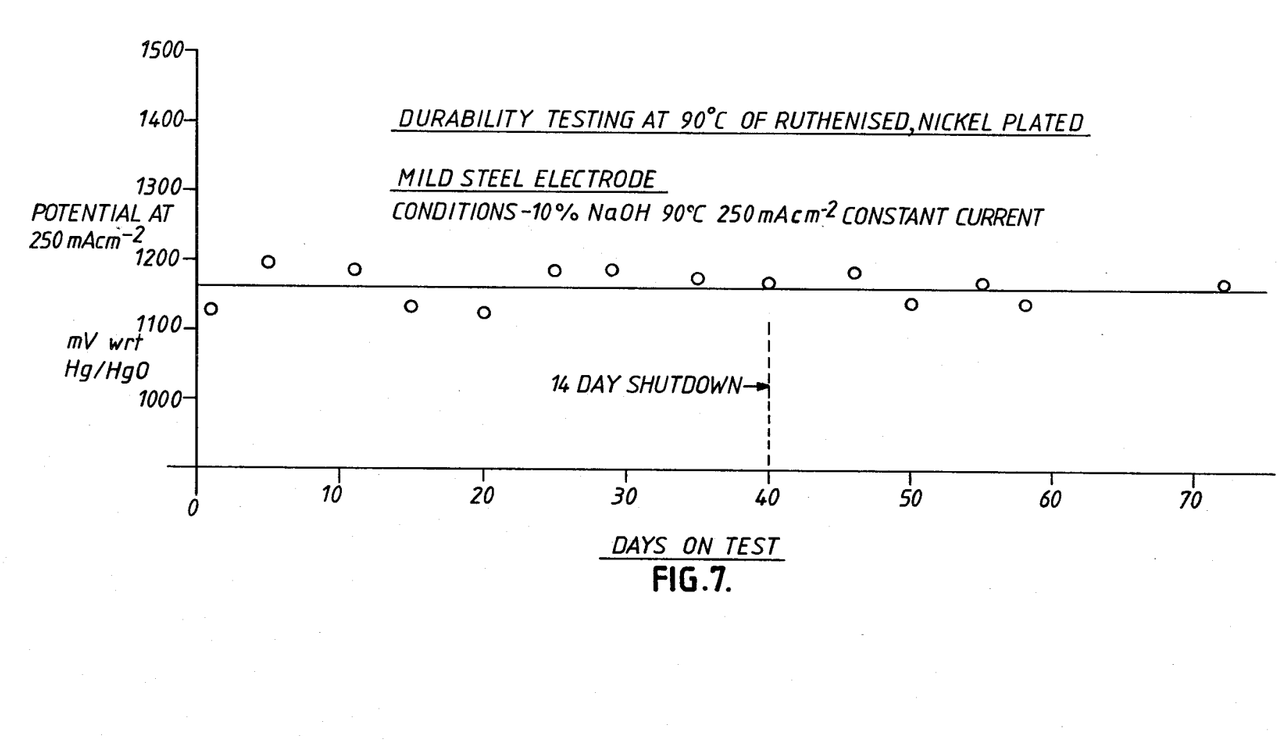
FIG. 7 shows the durability of a ruthenised nickel-plated mild steel cathode according to the invention.

FIG. 7 shows the durability testing in a chloroalkali cell operating at 90° C. of a cathode according to the invention consisting of an electrocatalytic deposit of ruthenium on a nickel matrix plated onto a mild steel cathode body, caustic soda concentration being 10% and the electrode potential being held at a constant 250 mAcm$^{-2}$. The electrode potential is seen to be substantially constant at about 1160 mV over a 70 day test period, excluding a shut-down for 14 days after day 40.

We claim:

1. A cathode suitable for use in a chloralkali process, the cathode comprising an electrolytic deposit of platinum and ruthenium having a roughness factor of at least 100 cm$^2$/cm$^2$ of geometric surface area, wherein the deposit is carried on an electrically conductive matrix and is selected from a group consisting of mixtures or alloys of platinum and ruthenium.

2. A cathode according to claim 1 wherein the deposit comprises dendrites.

3. A cathode according to claim 1 wherein the deposit is present in a loading of from 0.01 to 10 mg/cm$^2$ of the surface area of the electrically conductive matrix.

4. A cathode according to claim 3 wherein the loading is from 0.03 to 5 mg/cm$^2$.

5. A chloralkali cell incorporating a cathode as claimed in claim 1.

* * * * *

UNITED STATES PATENT AND TRADEMARK OFFICE
CERTIFICATE OF CORRECTION

PATENT NO. : 4,414,071

DATED : November 8, 1983

INVENTOR(S) : CAMERON ET AL

It is certified that error appears in the above-identified patent and that said Letters Patent is hereby corrected as shown below:

Claim 1, line 2, "electrolytic" should be changed to "electrocatalytic".

Signed and Sealed this

Fifteenth Day of December, 1987

Attest:

DONALD J. QUIGG

Attesting Officer      Commissioner of Patents and Trademarks